(12) United States Patent
Jankly

(10) Patent No.: US 11,070,357 B2
(45) Date of Patent: Jul. 20, 2021

(54) TECHNIQUES FOR PRIVACY-PRESERVING DATA PROCESSING ACROSS MULTIPLE COMPUTING NODES

(71) Applicant: Raytheon Company, Waltham, MA (US)

(72) Inventor: Steve P. Jankly, Pasadena, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 16/656,083

(22) Filed: Oct. 17, 2019

(65) Prior Publication Data

US 2021/0119765 A1    Apr. 22, 2021

(51) Int. Cl.
*H04L 9/00*    (2006.01)
*G06F 21/60*    (2013.01)

(52) U.S. Cl.
CPC .......... *H04L 9/008* (2013.01); *G06F 21/602* (2013.01)

(58) Field of Classification Search
CPC .............................. H04L 9/008; G06F 21/602
See application file for complete search history.

(56) References Cited

U.S. PATENT DOCUMENTS

| | | | |
|---|---|---|---|
| 7,856,100 B2 | 12/2010 | Wang et al. | |
| 8,249,250 B2 | 8/2012 | Rane et al. | |
| 8,681,973 B2 | 3/2014 | Weinman | |
| 9,716,590 B2 | 7/2017 | Gentry | |
| 9,729,312 B2 | 8/2017 | Bathen | |
| 10,320,843 B1 | 6/2019 | Dobrek et al. | |
| 2009/0327434 A1* | 12/2009 | Reynolds | G06Q 30/02 709/206 |
| 2012/0066510 A1* | 3/2012 | Weinman | H04L 9/008 713/189 |
| 2014/0233728 A1* | 8/2014 | Rohloff | H04L 9/008 380/28 |

(Continued)

FOREIGN PATENT DOCUMENTS

| | | |
|---|---|---|
| EP | 2809027 A1 | 12/2014 |
| EP | 3461054 A1 | 3/2019 |
| WO | 2014113132 A2 | 7/2014 |

OTHER PUBLICATIONS

Acar et al., "A Survey on Homomorphic Encryption Schemes: Theory and Implementation," ACM Computing Surveys (CSUR), vol. 51, Issue 4, Sep. 2018, 35 pages.

(Continued)

*Primary Examiner* — Meng Li

(57) ABSTRACT

A method used in a first environment includes obtaining first data to be processed in a second environment, homomorphically encrypting the first data to produce first encrypted data, and providing the first encrypted data to the second environment. The method also includes receiving supplemental data from the second environment, homomorphically encrypting the supplemental data to produce encrypted supplemental data, and providing the encrypted supplemental data to the second environment. The method further includes receiving second encrypted data from the second environment and homomorphically decrypting the second encrypted data to recover data processing results generated in the second environment using the first encrypted data and the encrypted supplemental data.

20 Claims, 4 Drawing Sheets

(56) References Cited

U.S. PATENT DOCUMENTS

| | | | |
|---|---|---|---|
| 2015/0312028 A1 | 10/2015 | Cheon et al. | |
| 2017/0041298 A1* | 2/2017 | Lehnhardt | H04L 63/0428 |
| 2017/0277774 A1* | 9/2017 | Eigner | G06Q 30/0269 |
| 2017/0277775 A1 | 9/2017 | Eigner et al. | |
| 2018/0091306 A1 | 3/2018 | Antonopoulos et al. | |
| 2018/0115412 A1 | 4/2018 | Smeets et al. | |
| 2018/0248683 A1* | 8/2018 | Diallo | H04L 9/08 |
| 2018/0278410 A1* | 9/2018 | Hirano | G06F 16/951 |
| 2020/0145389 A1* | 5/2020 | Shawe-Taylor | G06F 21/602 |
| 2020/0294056 A1* | 9/2020 | Patel | G06F 21/602 |

OTHER PUBLICATIONS

Albrecht et al., "Homomorphic Encryption Standard," homomorphicencryption.org, Mar. 2018, 33 pages.

Aono et al., "Efficient Key-Rotatable and Security-Updatable Homomorphic Encryption," SSC/17 Proceedings of the Fifth ACM International Workshop on Security in Cloud Computing, Apr. 2017, 8 pages.

Boneh et al., "Key Homomorphic PRFs and Their Applications," Proceedings of the 33rd Annual Cryptology Conference on Advances in Cryptology, Aug. 2013, 41 pages.

Brakerski et al., "(Leveled) Fully Homomorphic Encryption without Bootstrapping," Proceedings of the 3rd Innovations in Theoretical Computer Science Conference, Jan. 2012, 35 pages.

Brakerski et al., "Fully Homomorphic Encryption without Modulus Switching from Classical GapSVP," Proceedings of the 32nd Annual Cryptology Conference on Advances in Cryptology, Aug. 2012, 20 pages.

Fan et al., "Somewhat Practical Fully Homomorphic Encryption," IACR Cryptology ePrint Archive, Jan. 2012, 19 pages.

International Search Report and Written Opinion of the International Searching Authority in connection with International Patent Application No. PCT/US2020/030139 dated Jul. 8, 2020, 12 pages.

Agudo et al., "Cryptography goes to the Cloud," 1st International Workshop of Security and Trust for Applications in Virtualised Environments (STAVE 2011), Communications in Computer Information Science, vol. 187, 2011, 8 pages.

* cited by examiner

US 11,070,357 B2

TECHNIQUES FOR PRIVACY-PRESERVING DATA PROCESSING ACROSS MULTIPLE COMPUTING NODES

TECHNICAL FIELD

This disclosure relates generally to computing systems. More specifically, this disclosure relates to techniques for privacy-preserving data processing across multiple computing nodes.

BACKGROUND

Data security is becoming more and more important as increasing amounts of sensitive data are stored on and used by computing devices. Data encryption is commonly used in order to provide an enhanced level of assurance that sensitive data, as long as the data remains encrypted, cannot be viewed or otherwise used by unauthorized parties in the event of a data breach. Data breaches can take various forms, such as unauthorized interception of data during transmission or unauthorized access of data while stored.

While effective, one problem with data encryption is that it makes it difficult to share data between parties who want or need to work together but who may not necessarily trust one another. For example, it is becoming more common for public and private entities, such as governmental agencies and corporations, to mandate the use of open system architectures implementing modular standards in order to allow multiple vendors to participate in the design and implementation of a computing system or other system. In these or other types of situations, one party may be required to provide sensitive data to another (untrusted) party for processing. In some cases, sensitive data that is provided between parties may include information about the original algorithms that generated the data and/or other sensitive parameters or other sensitive information.

SUMMARY

This disclosure provides techniques for privacy-preserving data processing across multiple computing nodes.

In a first embodiment, an apparatus configured for use in a first environment includes an interface configured to communicate with at least one node in a second environment. The apparatus also includes at least one processor configured to obtain first data to be processed in the second environment, homomorphically encrypt the first data to produce first encrypted data, and provide the first encrypted data to the second environment via the interface. The at least one processor is also configured to receive supplemental data from the second environment via the interface, homomorphically encrypt the supplemental data to produce encrypted supplemental data, and provide the encrypted supplemental data to the second environment via the interface. The at least one processor is further configured to receive second encrypted data from the second environment via the interface and homomorphically decrypt the second encrypted data to recover data processing results generated in the second environment using the first encrypted data and the encrypted supplemental data.

In a second embodiment, a method used in a first environment includes obtaining first data to be processed in a second environment, homomorphically encrypting the first data to produce first encrypted data, and providing the first encrypted data to the second environment. The method also includes receiving supplemental data from the second environment, homomorphically encrypting the supplemental data to produce encrypted supplemental data, and providing the encrypted supplemental data to the second environment. The method further includes receiving second encrypted data from the second environment and homomorphically decrypting the second encrypted data to recover data processing results generated in the second environment using the first encrypted data and the encrypted supplemental data.

In a third embodiment, an apparatus configured for use in a second environment includes an interface configured to communicate with at least one node in a first environment. The apparatus also includes at least one processor configured to obtain homomorphically encrypted data from the first environment via the interface, provide supplemental data to the first environment via the interface, and receive homomorphically encrypted supplemental data from the first environment via the interface. The at least one processor is also configured to process the homomorphically encrypted data and the homomorphically encrypted supplemental data to generate encrypted data processing results and provide the encrypted data processing results to the first environment via the interface.

In a fourth embodiment, a method used in a second environment includes obtaining homomorphically encrypted data from a first environment, providing supplemental data to the first environment, and receiving homomorphically encrypted supplemental data from the first environment. The method also includes processing the homomorphically encrypted data and the homomorphically encrypted supplemental data to generate encrypted data processing results and providing the encrypted data processing results to the first environment.

In other embodiments, a non-transitory computer readable medium contains instructions that when executed cause at least one processor to perform the operations or steps recited in any of the first, second, third, and fourth embodiments and any of their dependent claims.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
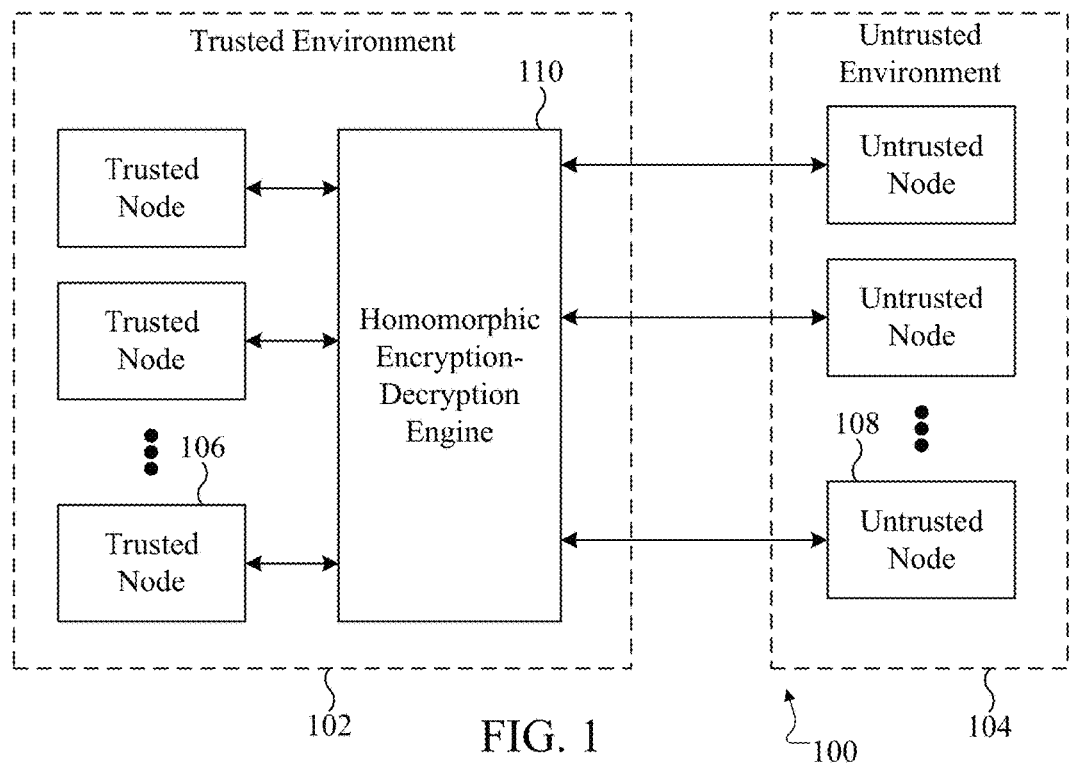
FIG. 1 illustrates an example system supporting privacy-preserving data processing across multiple computing nodes in accordance with this disclosure.

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, data encryption is commonly used (and can often be required by law) to help protect against data misappropriation by unauthorized parties. While data encryption can be effective, it makes it difficult to share data between parties who want or need to work together but who may not necessarily trust one another. For example, using approaches such as public key cryptography helps to protect sensitive data while the data is encrypted, since data encrypted using a particular party's public cryptographic key can only be decrypted using the particular party's private cryptographic key. However, the encrypted data would be inaccessible for use by other parties, unless the particular party's private key is shared with the other parties. Unfortunately, once the particular party's private key is shared, the other parties can decrypt any data encrypted using the particular party's public key. For that reason, private cryptographic keys are almost always closely guarded and not shared.

This disclosure describes various techniques for supporting privacy-preserving data processing across multiple computing nodes. As described in more detail below, homomorphic encryption and decryption are supported in a trusted environment, referring to a computing device, system, network, or other domain that is trusted by a particular party. Homomorphic encryption is supported in the trusted environment in order to provide encrypted data to an untrusted environment, referring to a computing device, system, network, or other domain that is not trusted by the particular party. The untrusted environment can perform one or more data processing operations on the encrypted data. Encrypted data processing results from the untrusted environment are received back at the trusted environment, and homomorphic decryption is supported in the trusted environment in order to recover unencrypted data processing results. The trusted environment also supports an encryption service that can receive supplemental data from the untrusted environment, encrypt the supplemental data using homomorphic encryption, and provide the encrypted supplemental data back to the untrusted environment for use in processing the original encrypted data and in generation of the encrypted data processing results.

Among other things, these techniques support the use of homomorphic encryption and decryption in real-time multi-node environments. Homomorphic encryption is an encryption technique that allows various computations to be performed on encrypted data (often referred to as ciphertext), where the results of the computations are also encrypted. After decrypting the encrypted results of the computations, the decrypted results match the results that would have been produced had the same computations been performed on the original unencrypted data (often referred to as plaintext). In other words, a first party can provide encrypted data to a second (possibly untrusted) party, the second party can process the encrypted data and generate encrypted data processing results, the first party can receive and decrypt the encrypted data processing results, and the decrypted data processing results match the results that would have been obtained had the second party performed the same data processing operations using unencrypted data.

This helps to protect original unencrypted data from being provided to or recovered by an untrusted party for use by the untrusted party, since the untrusted party (ideally) cannot decrypt the original data or the results of the computations performed on the original data. Since homomorphic encryption is used here, nodes in an untrusted environment are able to perform various operations on encrypted data and to return encrypted data processing results without exposing the original unencrypted data, information about the original algorithms or data sources that generated the original data, and/or other sensitive parameters to the untrusted party. The untrusted party also does not need the other party's private cryptographic key to perform any operations. Moreover, the techniques described here allow a system to be tailored to specific requirements within tactical environments or other environments, such as environments in which multiple high-bandwidth source data streams are received and where multiple data processing algorithms are applied to one, some, or all of the data streams (possibly in real-time). In some embodiments, these approaches allow for a secure "black box" approach to data processing, where one or more secure nodes in a trusted environment only provide encrypted data to one or more nodes in an untrusted environment and receive encrypted results from the untrusted environment.

FIG. 1 illustrates an example system 100 supporting privacy-preserving data processing across multiple computing nodes in accordance with this disclosure. As shown in FIG. 1, the system 100 includes at least one trusted environment 102 and at least one untrusted environment 104. Each trusted environment 102 generally represents a physical or logical computing, networking, or other domain in which a first party has confidence with respect to data access control, data security, or the like. In contrast, each untrusted environment 104 generally represents a physical or logical computing, networking, or other domain in which the first party does not have confidence with respect to data access control, data security, or the like. Often times, this lack of trust in the untrusted environment 104 exists because the untrusted environment 104 is owned, used, or otherwise associated with a second party who is not necessarily trusted by the first party. As a particular example, the first and second parties may be competitors, such as different vendors working on or otherwise associated with a project having an open system architecture supporting one or more modular standards.

In this particular example, the trusted environment 102 includes one or more trusted computing nodes 106, and the untrusted environment 104 includes one or more untrusted computing nodes 108. Each computing node 106 and 108 generally represents a device or system that can generate data used in at least one of the environments 102, 104 and/or that can process data in some manner. In some embodiments, for example, one or more of the computing nodes 106 can generate multiple data streams. Each data stream may be provided to one or more of the computing nodes 106 for processing, and/or each data stream may be encrypted and sent to one or more of the computing nodes 108 for processing. The results of the data processing (either by the trusted environment 102 or the untrusted environment 104) can be provided to one or more of the computing nodes 106 for further processing or encrypted and provided to one or more of the computing nodes 108 for further processing.

Each computing node 106 and 108 represents any suitable computing, processing, or other device configured to generate or process data. Example types of computing nodes 106 and 108 can include desktop computers, laptop computers, tablet computers or other mobile devices, server computers, or other devices. Since the possible applications for computing nodes are huge and constantly increasing in today's society, the actual functions of the computing nodes 106 and 108 can vary greatly. This disclosure is not limited to any particular types of computing nodes or to any particular applications or uses of data in trusted and untrusted environments.

To support privacy-preserving data processing across different computing nodes 106 and 108 in the different environments 102 and 104, a homomorphic encryption-decryption engine 110 is used in the trusted environment 102. The encryption-decryption engine 110 supports homomorphic encryption of data being sent from the trusted environment 102 to the untrusted environment 104, as well as homomorphic decryption of data being sent from the untrusted environment 104 to the trusted environment 102. As noted above, homomorphic encryption is an encryption technique that allows various computations to be performed on encrypted data, where the results of the computations are also encrypted. Decrypting the encrypted results of the computations produces unencrypted results, which match the results that would have been produced had the same computations been performed on the original unencrypted data.

In the context of FIG. 1, homomorphic encryption allows certain computations to be performed by one or more untrusted computing nodes 108 using encrypted data from the trusted environment 102, and the data processing results produced by the one or more untrusted computing nodes 108 are also encrypted. Once the encrypted data processing results are decrypted, the unencrypted data processing results match the results that would have been produced had the same computations been performed by the one or more untrusted computing nodes 108 using the original unencrypted data. This allows the untrusted environment 104 to receive and process data from the trusted environment 102 and to provide the results of the processing back to the trusted environment 102 for use. This is accomplished without any of the untrusted computing nodes 108 in the untrusted environment 104 having access to the original unencrypted data and without giving any of the untrusted computing nodes 108 in the untrusted environment 104 access to a private cryptographic key to unencrypt the data being processed. The encryption-decryption engine 110 performs the necessary homomorphic encryption and decryption operations in order to support the secure exchange of data between the trusted environment 102 and the untrusted environment 104.

The encryption-decryption engine 110 also supports an encryption service that can be accessed by the untrusted environment 104. The encryption service allows one or more of the untrusted computing nodes 108 in the untrusted environment 104 to provide supplemental data (which may also be called "local" data) to the encryption-decryption engine 110 for homomorphic encryption. The encryption-decryption engine 110 can encrypt the supplemental data using the same type of homomorphic encryption used with the original encrypted data being processed in the untrusted environment 104. The encryption-decryption engine 110 can provide this encrypted supplemental data back to the one or more untrusted computing nodes 108 in the untrusted environment 104 for processing along with the original encrypted data sent to the untrusted environment 104.

Various other features can be supported by the encryption-decryption engine 110 and are described in more detail below. For example, the encryption-decryption engine 110 can support key rotation functionality, which allows different cryptographic keys to be used by the encryption-decryption engine 110 to encrypt and decrypt data over time. This may allow, for instance, the encryption-decryption engine 110 to use different cryptographic keys to encrypt different data sent to the same untrusted computing node 108 or to different untrusted computing nodes 108 over time. As another example, the encryption-decryption engine 110 can support a randomization function that randomizes or otherwise changes the ordering of data (possibly from multiple data channels) to be encrypted. The data being reordered here can include the data from one or more trusted computing nodes 106, as well as data identifiers or other metadata associated with that data. This may allow, for instance, the encryption-decryption engine 110 to reorder information contained in the encrypted data sent to the untrusted environment 104 in different ways over time. Additional features of the encryption-decryption engine 110 are described below and can be used here.

The encryption-decryption engine 110 includes any suitable structure configured to homomorphically encrypt and decrypt data. For example, the encryption-decryption engine 110 can represent a computing node having one or more processors, one or more memories, and one or more communication interfaces. The one or more processors can execute instructions (such as those stored in memory) for performing encryption, decryption, and other operations of the engine 110. The one or more memories can store instructions and data used, generated, or collected by the processor(s) or the encryption-decryption engine 110. The one or more communication interfaces can support communications to and from the encryption-decryption engine 110, such as by engaging in wired or wireless communications between the encryption-decryption engine 110 and the various computing nodes 106 and 108. Note that the encryption-decryption engine 110 here can support any suitable homomorphic encryption technique or techniques now known or later developed. Example types of cryptosystems that may be supported by the encryption-decryption engine 110 can include the Paillier and El Gamal partially homomorphic cryptosystems and the Brakerski-Gentry-Vaikuntanathan and Brakerski/Fan-Vercauteren fully homomorphic cryptosystems.

Note that this disclosure will often describe the data being provided from the trusted environment 102 to the untrusted environment 104 as being encrypted. However, this need not always be the case. There may be some instances, for example, where it may be necessary or desirable to provide unencrypted data from the trusted environment 102 to the untrusted environment 104.

Although FIG. 1 illustrates one example of a system 100 supporting privacy-preserving data processing across multiple computing nodes, various changes may be made to FIG. 1. For example, the system 100 may include any number of trusted and untrusted environments 102 and 104, and each environment 102 or 104 may include any number of computing nodes 106 or 108 in any suitable arrangement. Also, the system 100 in FIG. 1 has been shown in simplified form to facilitate easier understanding of various inventive concepts, and computing and communication systems can come in a wide variety of configurations. This disclosure is not limited to use with any particular configuration of environments and computing nodes. In addition, various components shown in FIG. 1 can be combined, further subdivided, rearranged, or omitted or additional components can be added according to particular needs. As a specific example, at least one instance of the homomorphic encryption-decryption engine 110 may be executed by, implemented or included within, or otherwise associated with one or more of the trusted computing nodes 106.

Figure 2:
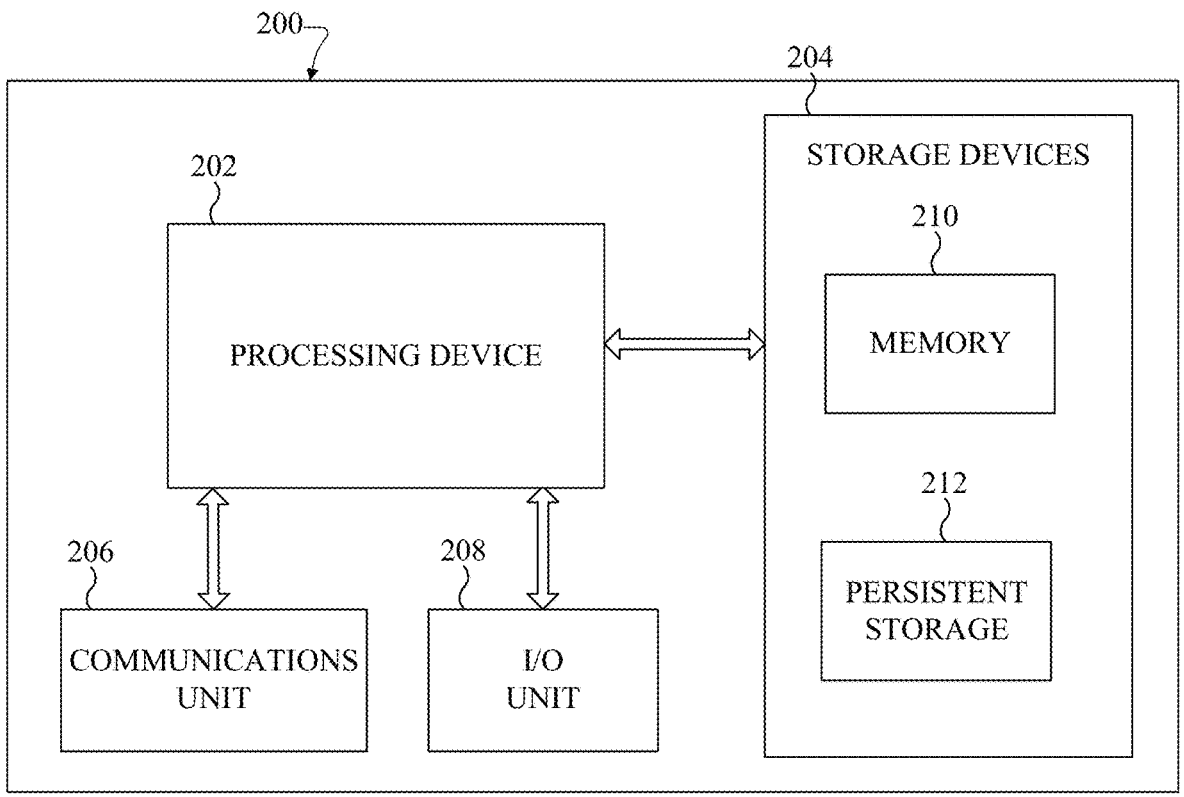
FIG. 2 illustrates an example computing node supporting privacy-preserving data processing in accordance with this disclosure.

FIG. 2 illustrates an example computing node 200 supporting privacy-preserving data processing in accordance with this disclosure. For ease of explanation, the computing node 200 shown in FIG. 2 may be described as being used to implement or represent any or all of the trusted computing nodes 106, the untrusted computing nodes 108, and/or the homomorphic encryption-decryption engine 110 in the system 100 shown in FIG. 1. However, each trusted computing node 106, untrusted computing node 108, and homomorphic encryption-decryption engine 110 may be implemented in any other suitable manner.

As shown in FIG. 2, the computing node 200 includes at least one processing device 202, at least one storage device 204, at least one communications unit 206, and at least one input/output (I/O) unit 208. The processing device 202 executes instructions that may be loaded into a memory 210. The processing device 202 includes any suitable number(s) and type(s) of processors or other data processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry for performing at least the functions described in this patent document.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include at least one network interface card or wireless transceiver facilitating communications over one or more wired or wireless networks or connections. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that if the computing node 200 represents a server or other network-based device, the local input or output of I/O data may not be needed, and no local I/O unit 208 may be provided in the computing node 200.

In some embodiments, the instructions executed by the processing device 202 can include instructions that implement one or more functions of a trusted computing node 106. For example, the instructions executed by the processing device 202 may include instructions that cause the processing device 202 to generate one or more data streams or other data. That data can be provided to the encryption-decryption engine 110 for encryption prior to communication to an untrusted environment 104. That data can also or alternatively be used by the same trusted computing node 106 or provided to one or more other trusted computing nodes 106 for processing. The data from the trusted computing node 106 can be used in any other suitable manner. As another example, the instructions executed by the processing device 202 may include instructions that cause the processing device 202 to receive data from an untrusted environment 104 via the encryption-decryption engine 110 and to process or forward the data. In general, the instructions executed by the processing device 202 of a trusted computing node 106 can be used to perform any function(s) of the trusted computing node 106 as needed or desired.

In other embodiments, the instructions executed by the processing device 202 can include instructions that implement one or more functions of an untrusted computing node 108. For example, the instructions executed by the processing device 202 may include instructions that cause the processing device 202 to receive encrypted data from the encryption-decryption engine 110, perform one or more computations or other data processing operations on the encrypted data, and return the results of the data processing operations to the encryption-decryption engine 110. As another example, the instructions executed by the processing device 202 may include instructions that cause the processing device 202 to provide supplemental data to the encryption-decryption engine 110 and receive encrypted supplemental data from the encryption-decryption engine 110 for use by that untrusted computing node 108 or one or more other untrusted computing nodes 108. In general, the instructions executed by the processing device 202 of an untrusted computing node 108 can be used to perform any function(s) of the untrusted computing node 108 as needed or desired.

In still other embodiments, the instructions executed by the processing device 202 can include instructions that implement one or more functions of an encryption-decryption engine 110. For example, the instructions executed by the processing device 202 may include instructions that cause the processing device 202 to encrypt data in a homomorphic fashion and to provide the encrypted data to an untrusted environment 104. The instructions executed by the processing device 202 may also include instructions that cause the processing device 202 to decrypt data received from the untrusted environment 104 in a homomorphic fashion and to provide the decrypted data to one or more destinations, such as a trusted data storage or one or more trusted computing nodes 106. The instructions executed by the processing device 202 may further include instructions that cause the processing device 202 to perform associated functions, such as key rotation and data reordering. In general, the instructions executed by the processing device 202 of an encryption-decryption engine 110 can be used to perform any function(s) of the encryption-decryption engine 110 as needed or desired.

Although FIG. 2 illustrates one example of a computing node 200 supporting privacy-preserving data processing, various changes may be made to FIG. 2. For example, the computing node 200 may include any suitable number(s) and arrangement(s) of processing devices, memories, and other components. Also, computing devices and systems come in a wide variety of configurations, and FIG. 2 does not limit this disclosure to any particular computing device or system. In addition, as noted above, the same computing node 200 may be configured to operate as both a trusted computing node 106 and an encryption-decryption engine 110.

Figure 3:
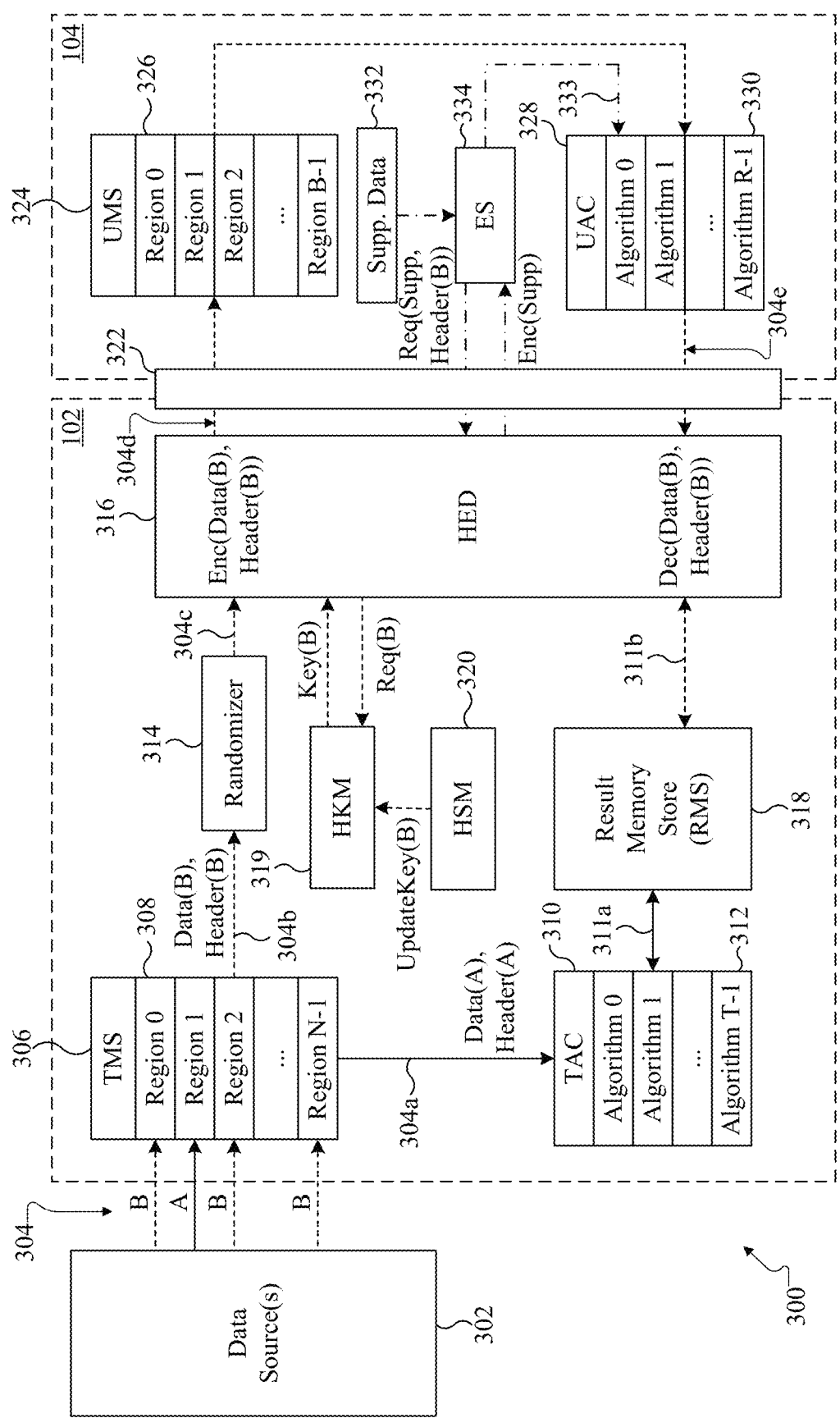
FIG. 3 illustrates an example functional architecture supporting privacy-preserving data processing across multiple computing nodes in accordance with this disclosure.

FIG. 3 illustrates an example functional architecture 300 supporting privacy-preserving data processing across multiple computing nodes in accordance with this disclosure. For ease of explanation, the functional architecture 300 shown in FIG. 3 may be described as involving various components in the system 100 shown in FIG. 1, each of which may include or be implemented using the structure shown in FIG. 2. However, the functional architecture 300 may be used with any other suitable devices and in any other suitable systems.

As shown in FIG. 3, one or more data sources 302 provide data 304 to or within a trusted environment 102. Each data source 302 represents any suitable source of data to be used in a trusted environment 102 or an untrusted environment 104. For example, one or more data sources 302 that each provide at least one data stream may be used here. Of course, one or more non-streaming data sources 302 may also or alternatively be used here. In this particular example, the one or more data sources 302 are providing both (i) data 304a (also labeled "A") intended for use within the trusted environment 102 and (ii) data 304b (also labeled "B") intended for use within the untrusted environment 104. Note, however, that there may be some instances in which all data 304 is intended for use within one environment 102, 104 or where the same data 304 is intended for use in both environments 102, 104. Also note that while the one or more data sources 302 are shown in FIG. 3 as residing outside the trusted environment 102, this need not be the case. For instance, at least one data source 302 may reside within the trusted environment 102, such as when at least one data source 302 is implemented using at least one trusted computing node 106 or is otherwise a trusted device or system in the trusted environment 102.

The data 304 is provided to a trusted memory store (TMS) 306, which stores the data 304 and any associated headers or related information to be processed. The trusted memory store 306 can store information at various memory locations, and related information (such as data 304 and its headers received from a common data source 302) can be stored in groups of memory locations referred to as regions 308 within the trusted memory store 306. In this particular example, there are N regions 308 within the trusted memory store 306, which can be used to store N collections of data from the data source(s) 302. The trusted memory store 306 includes any suitable structure configured to store and facilitate retrieval of information. In some embodiments, the trusted memory store 306 may represent or include at least one tamper-resistant memory, such as a memory that erases data when one or more conditions associated with possible or actual tampering are sensed. However, the use of tamper-resistant memory is not required. In some embodiments, the trusted memory store 306 may represent or include one or more storage devices 204 in one or more trusted computing nodes 106 or in the encryption-decryption engine 110.

Data 304a intended for use within the trusted environment 102 can be retrieved from the trusted memory store 306 and processed using a trusted algorithm collection (TAC) 310, which includes one or more data processing algorithms 312 that operate on this data 304a. Each algorithm 312 may be used to perform any desired operations on or using this data 304a. For example, one or more algorithms 312 may represent signal processing algorithms that operate using this data 304a. Also, depending on the functionality needed, the data 304a can be processed using one or multiple algorithms 312, and it may be possible for the output of one algorithm 312 to be input to another algorithm 312 (and this may occur for any number of algorithms 312 operating in series). In this particular example, there are T algorithms 312 within the trusted algorithm collection 310. In some embodiments, the algorithm(s) 312 of the trusted algorithm collection 310 may be executed or otherwise provided or supported by one or more processors 202 of one or more trusted computing nodes 106 in the trusted environment 102. Results 311a from the execution of the algorithm(s) 312 can be stored in a result memory store (RMS) 318.

Data 304b intended for use within the untrusted environment 104 can be retrieved from the trusted memory store 306 and reordered using a randomizer 314. The randomizer 314 reorders the data 304b and any data identifiers or other metadata associated with the data 304b (such as information contained in headers) to produce reordered data 304c. For example, the randomizer 314 can receive the data 304b in multiple input data streams from the data source(s) 302 via the trusted memory store 306 and randomize the ordering of the data streams. The randomizer 314 can use any suitable technique to reorder data that is being provided to the untrusted environment 104. The randomizer 314 includes any suitable structure configured to reorder data. In some embodiments, the randomizer 314 may be executed or otherwise provided or supported by one or more processors of the encryption-decryption engine 110 in the trusted environment 102.

A homomorphic encryptor-decryptor (HED) 316 performs encryption and decryption operations to support interactions with the untrusted environment 104. For example, the homomorphic encryptor-decryptor 316 can perform homomorphic encryption operations to encrypt the reordered data 304c from the randomizer 314, and the resulting encrypted data 304d can be output to the untrusted environment 104. The homomorphic encryptor-decryptor 316 can also perform homomorphic decryption operations to decrypt encrypted data 304e received from the untrusted environment 104, and the decrypted data (such as results 311b associated with the data processing performed in the untrusted environment 104) can be output to the result memory store 318 or other destination(s). The homomorphic encryptor-decryptor 316 can further perform homomorphic encryption operations to encrypt data received from the untrusted environment 104. The homomorphic encryptor-decryptor 316 can support any suitable homomorphic encryption and decryption operations, such as by supporting the Paillier, El Gamal, Brakerski-Gentry-Vaikuntanathan, Brakerski/Fan-Vercauteren, or other homomorphic cryptosystem. The homomorphic encryptor-decryptor 316 includes any suitable structure configured to perform homomorphic encryption and decryption operations. In some embodiments, the homomorphic encryptor-decryptor 316 may be executed or otherwise provided or supported by one or more processors of the encryption-decryption engine 110 in the trusted environment 102.

The result memory store 318 can be used to store the results 311a obtained through execution of the one or more algorithms 312 of the trusted algorithm collection 310 and the results 311b obtained from the untrusted environment 104. The result memory store 318 includes any suitable structure configured to store and facilitate retrieval of information. Depending on the implementation, the result memory store 318 may or may not represent or include at least one tamper-resistant memory. In some embodiments, the result memory store 318 may represent or include one or more storage devices 204 in one or more trusted computing nodes 106 or in the encryption-decryption engine 110.

A homomorphic key manager (HKM) 319 provides cryptographic keys that are used by the homomorphic encryptor-decryptor 316 to encrypt and decrypt data. In some embodiments, the cryptographic keys provided by the homomorphic key manager 319 can be pre-generated, stored (such as in a secure tamper-resistant non-volatile memory), and retrieved by the homomorphic key manager 319 as needed. In other embodiments, the cryptographic keys provided by the homomorphic key manager 319 can be generated by the homomorphic key manager 319 as needed. Of course, the cryptographic keys can be generated ahead of time or on demand in any other suitable manner. The homomorphic key manager 319 includes any suitable structure configured to provide (and possibly generate) cryptographic keys. In some embodiments, the homomorphic key manager 319 may be executed or otherwise provided or supported by one or more processors of the encryption-decryption engine 110 in the trusted environment 102. In the illustrated example, the homomorphic key manager 319 can provide the cryptographic keys to the homomorphic encryptor-decryptor 316 in response to requests for the cryptographic keys from the encryptor-decryptor 316.

A homomorphic security manager (HSM) 320 also controls the operation of the homomorphic key manager 319 by sending requests to the homomorphic key manager 319 to update the cryptographic keys used by the homomorphic encryptor-decryptor 316. The homomorphic security manager 320 may send these requests to the homomorphic key manager 319 at a predefined interval, in response to one or more triggering events, or at any other suitable times. The homomorphic security manager 320 thereby controls the use of the cryptographic keys by the homomorphic encryptor-decryptor 316 and helps to implement key rotation within the architecture 300. The homomorphic security manager 320 includes any suitable structure configured to control key rotation in a trusted environment 102. In some embodiments, the homomorphic security manager 320 may be executed or otherwise provided or supported by one or more processors of the encryption-decryption engine 110 in the trusted environment 102.

In some embodiments, the one or more triggering events that cause the homomorphic security manager 320 to send a request for changing keys to the homomorphic key manager 319 may include one or both of hardware signals and software signals. Hardware signals may include signals sent by an FPGA or other hardware device in the trusted environment 102. Software signals may include signals sent by a Portable Operating System Interface (POSIX) or other operating system or program in the trusted environment 102. Whatever the source, a signal handler within the homomorphic security manager 320 may identify the signal and alert the homomorphic key manager 319 to change keys. This may allow, for example, deterministic time slots to be used for key rotation. Note, however, that the functionality of the homomorphic security manager 320 may be incorporated into the homomorphic key manager 319 so that the homomorphic key manager 319 can receive signals and update keys in response.

An interface 322 supports communications between the trusted environment 102 and the untrusted environment 104. For example, the interface 322 can receive encrypted data 304d from the homomorphic encryptor-decryptor 316 and provide the encrypted data 304d to one or more untrusted computing nodes 108 in the untrusted environment 104. The interface 322 can also receive encrypted data 304e from one or more untrusted computing nodes 108 in the untrusted environment 104 and provide the encrypted data to the homomorphic encryptor-decryptor 316 for decryption. The interface 322 can support the exchange of any other desired data between the trusted and untrusted environments 102, 104. The interface 322 supports communications between the trusted environment 102 and the untrusted environment 104 in any suitable manner, such as by supporting communications over one or more wired or wireless networks or connections.

Encrypted data 304d received within the untrusted environment 104 from the trusted environment 102 is provided to an untrusted memory store (UMS) 324, which stores the encrypted data 304d. The untrusted memory store 324 can store information at various memory locations, and related information can be stored in groups of memory locations referred to as regions 326 within the untrusted memory store 324. In this particular example, there are B regions 326 within the untrusted memory store 324, which can be used to store B collections of data. The untrusted memory store 324 includes any suitable structure configured to store and facilitate retrieval of information. In some embodiments, the untrusted memory store 324 may represent or include at least one tamper-resistant memory, such as a memory that erases data when one or more conditions associated with possible or actual tampering are met. However, the use of tamper-resistant memory is not required. In some embodiments, the untrusted memory store 324 may represent or include one or more storage devices 204 in one or more untrusted computing nodes 108.

The encrypted data 304d can be retrieved from the untrusted memory store 324 and processed using an untrusted algorithm collection (UAC) 328, which includes one or more data processing algorithms 330 that operate on the encrypted data 304d. Each of these algorithms 330 may be used to perform any desired functions using the encrypted data 304d. For example, one or more of the algorithms 330 may represent signal processing algorithms that operate using the encrypted data 304d. Again, depending on the functionality needed, the encrypted data 304d can be processed using one or multiple algorithms 330, and it may be possible for the output of one algorithm 330 to be input to another algorithm 330 (and this may occur for any number of algorithms 330 operating in series). In this particular example, there are R algorithms 330 within the untrusted algorithm collection 328. In some embodiments, the algorithm(s) 330 of the untrusted algorithm collection 328 may be executed or otherwise provided or supported by one or more processors 202 of one or more untrusted computing nodes 108 in the untrusted environment 104. Results 311b from the execution of the algorithm(s) 330 can be stored in the result memory store 318 via the interface 322.

In some cases, one or more algorithms 330 executed in the untrusted environment 104 may need to use local or supplemental data 332 when processing the encrypted data 304d from the trusted environment 102. In order to support the processing of the encrypted data 304d from the trusted environment 102 along with the supplemental data 332, an encryption service 334 in the untrusted environment 104 can receive the supplemental data 332 and the headers contained in the encrypted data 304d to be processed with the supplemental data 332. The encryption service 334 provides this information to the encryption service supported by the homomorphic encryptor-decryptor 316, and the homomorphic encryptor-decryptor 316 can identify the encryption key to be used to encrypt the supplemental data 332 based on the encrypted headers sent with the supplemental data 332. Assuming the encryption key is still valid and has not been replaced due to key rotation, the homomorphic encryptor-decryptor 316 then returns encrypted supplemented data 333 to the encryption service 334, which can provide the encrypted supplemented data 333 to the one or more algorithms 330. This allows the one or more algorithms 330 to perform signal processing operations or other data processing operations using the encrypted data 304 and the encrypted supplemented data 333, both of which are homomorphically encrypted. This prevents the untrusted environment 104 from accessing the original unencrypted version of the data 304 while allowing the processing of the encrypted data 304 with the encrypted supplemented data 333. If the encryption key used in the trusted environment 102 is no longer valid, the homomorphic encryptor-decryptor 316 can return an error to the encryption service 334 via the interface 322. This may allow the trusted environment 102 to place timing constraints on the operations to be performed using the one or more data processing algorithms 330.

In this way, the functional architecture 300 supports privacy-preserving data processing across multiple computing nodes 106 and 108 in both trusted and untrusted environments 102 and 104. Some data 304a can be processed within the trusted environment 102, while other data 304b can be encrypted and processed within the untrusted environment 104 (and the data processing results decrypted within the trusted environment 102). Also, the reordering of the data 304b being encrypted and the rotation of the cryptographic keys used by the homomorphic encryptor-decryptor 316 to help provide improved security. In addition, the ability for the untrusted environment 104 to provide supplemental data 332 to the homomorphic encryptor-decryptor 316 for encryption expands the data processing capabilities of the functional architecture 300. This is because data processing operations can be performed by one or more algorithms 330 using the supplemented data 332, since (via homomorphic encryption) the data processing results obtained by processing the encrypted data 304 and the encrypted supplemented data 333 match the data processing results that would have been obtained by processing unencrypted data 304 and unencrypted supplemented data 332.

As noted above, there may be some instances where it may be necessary or desirable to provide unencrypted data from the trusted environment 102 to the untrusted environment 104. In those cases, the data 304b can bypass the randomizer 314 and the homomorphic encryptor-decryptor 316 and be provided to the untrusted environment 104 via the interface 322. To provide data security, that data might be encrypted in the trusted domain 102 using an encryption technique that can be reversed in the untrusted environment 104, such as by encrypting the data using the untrusted party's public cryptographic key. Also, in those cases, any data processing results 311b received from the untrusted environment 104 may be unencrypted or may be encrypted using an encryption technique that can be reversed in the trusted environment 102, such as by encrypting the data using the trusted party's public cryptographic key.

There may also be some instances where the data to be processed in the untrusted environment 104 in first pre-processed, such as within the trusted environment 102 or within the data source(s) 302. If first processed in the trusted environment 102, the data may be retrieved from the trusted memory store 306 and processed using one or more data processing algorithms 312. The results may then be provided to the randomizer 314, such as directly from the one or more data processing algorithms 312 or indirectly (like via the trusted memory store 306 or the result memory store 318). In general, there are various ways in which data can be processed in trusted and untrusted environments 102 and 104, and any or all of these processes can be supported in the system 100.

Although FIG. 3 illustrates one example of a functional architecture 300 supporting privacy-preserving data processing across multiple computing nodes, various changes may be made to FIG. 3. For example, various components shown in FIG. 3 can be combined, further subdivided, rearranged, or omitted or additional components can be added according to particular needs. Also, the values of N, T, B, and R above are merely meant to indicate that various numbers of memory regions and algorithms might be used in the functional architecture 300. Each of these values may have any suitable value, and these four values may or may not equal one another. In addition, the functional architecture 300 may be used to receive any suitable number of data streams or other data inputs.

Figure 4:
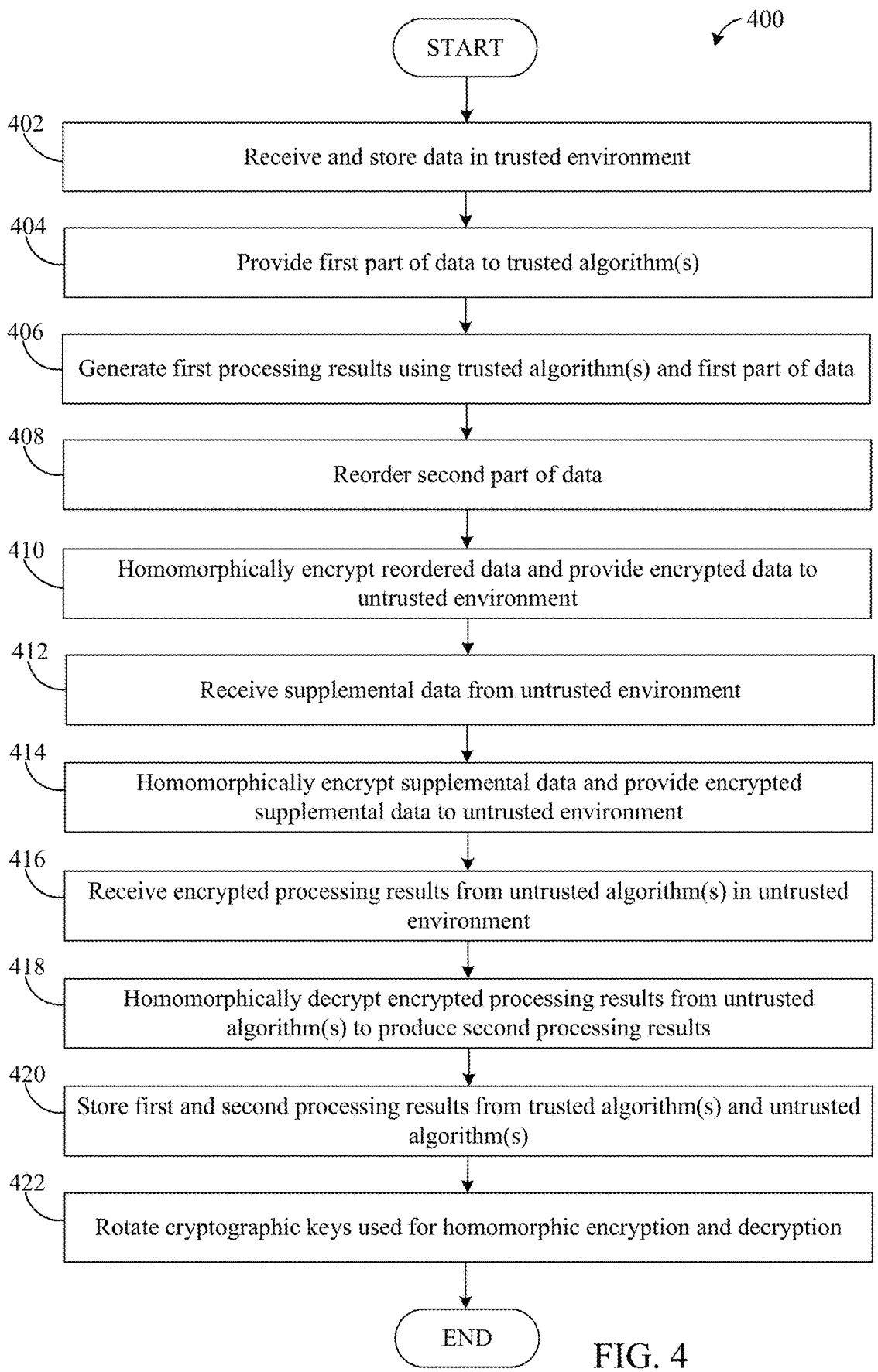
FIGS. 4 and 5 illustrate example methods for supporting privacy-preserving data processing across multiple computing nodes in accordance with this disclosure.
Figure 5:
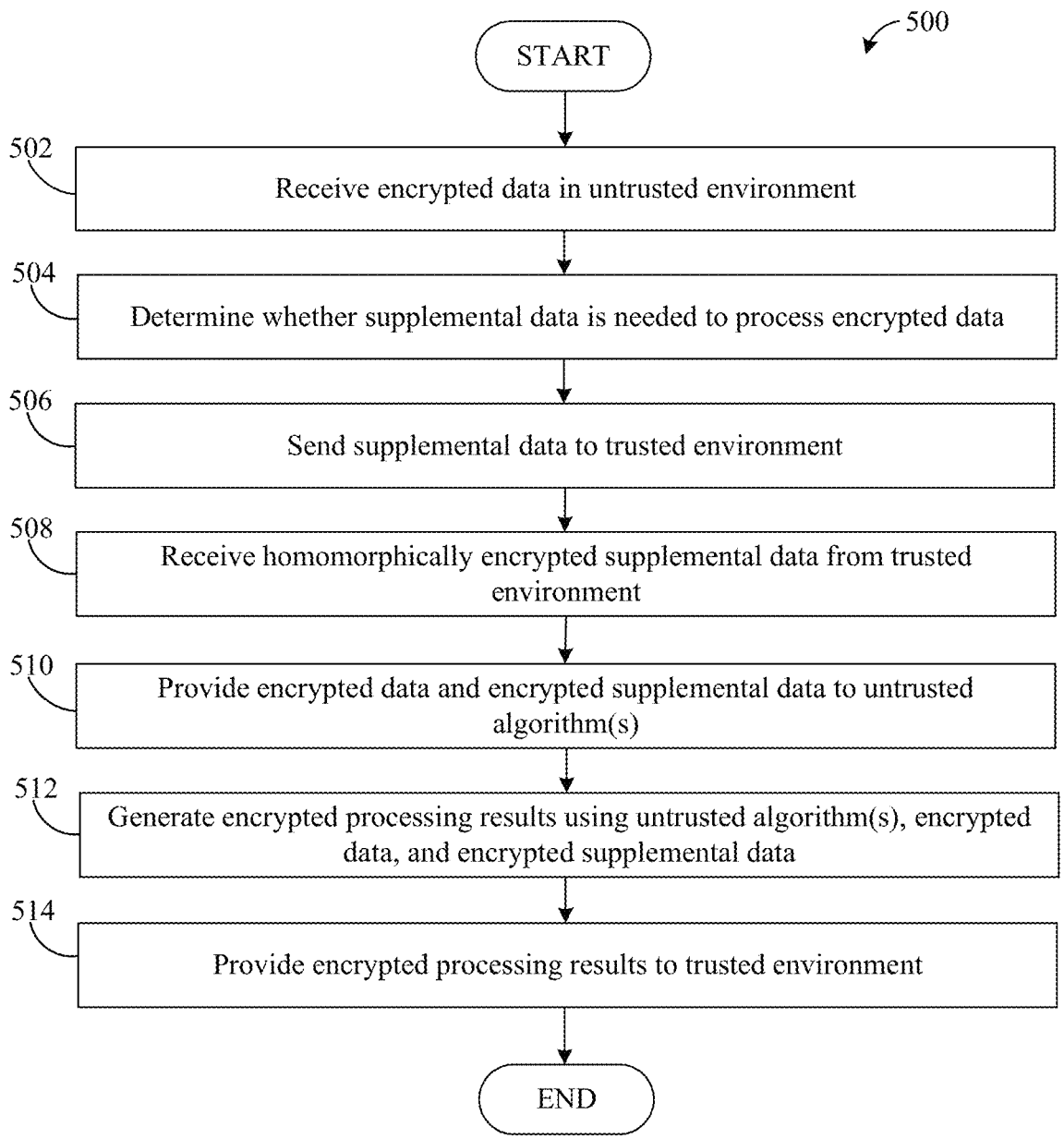

FIGS. 4 and 5 illustrate example methods for supporting privacy-preserving data processing across multiple computing nodes in accordance with this disclosure. In particular, FIG. 4 illustrates an example method 400 performed in or using a trusted environment, and FIG. 5 illustrates an example method 500 performed in or using an untrusted environment. For ease of explanation, the methods 400 and 500 shown in FIGS. 4 and 5 may be described as involving various components in the system 100 shown in FIG. 1, each of which may include or be implemented using the structure shown in FIG. 2, to implement the functional architecture 300 shown in FIG. 3. However, the methods 400 and 500 may be used with any other suitable devices in any other suitable systems to support any other suitable functional architectures.

As shown in FIG. 4, data is received and stored in a trusted environment at step 402. This may include, for example, one or more data sources 302 (within or outside the trusted environment 102) providing data 304 to the trusted environment 102. As a particular example, this may include one or more data sources 302 providing one or multiple data streams to the trusted environment 102. This may also include storing the data 304 in the trusted memory store 306.

A first part of the data is provided to one or more trusted algorithms at step 404, and first processing results are generated using the one or more trusted algorithms and the first part of the data at step 406. This may include, for example, one or more data processing algorithms 312 retrieving data 304a to be processed within the trusted environment 102 from the trusted memory store 306. This may also include the one or more data processing algorithms 312 using the retrieved data 304a to generate data processing results 311a.

A second part of the data is reordered at step 408. This may include, for example, the randomizer 314 retrieving data 304b to be processed outside the trusted environment 102 from the trusted memory store 306. This may also include the randomizer 314 reordering the data 304b to produce reordered data 304c. As noted above, the randomizer 314 can use any suitable technique to reorder data, such as by reordering the data contained in multiple data streams. The reordered data is homomorphically encrypted and provided to an untrusted environment at step 410. This may include, for example, the homomorphic encryptor-decryptor 316 performing homomorphic encryption of the reordered data 304c to produce encrypted data 304d. The homomorphic encryptor-decryptor 316 can use any suitable cryptographic key(s) previously or concurrently provided by the homomorphic key manager 319 to generate the encrypted data 304d. This may also include the homomorphic encryptor-decryptor 316 providing the encrypted data 304d to the untrusted environment 104 via the interface 322.

Supplemental data is received from the untrusted environment at step 412. This may include, for example, the homomorphic encryptor-decryptor 316 receiving a request containing supplemental data 332 from the untrusted environment 104 via the interface 322. The request includes one or more encrypted headers that allow an identification of the cryptographic key to be used to encrypt the supplemental data 332. The supplemental data is homomorphically encrypted and provided to the untrusted environment at step 414. This may include, for example, the homomorphic encryptor-decryptor 316 performing homomorphic encryption of the supplemental data 332 to produce encrypted supplemental data 333. The homomorphic encryptor-decryptor 316 can use the same cryptographic key(s) used to produce the encrypted data 304d in order to encrypt the supplemental data 332. This may also include the homomorphic encryptor-decryptor 316 providing the encrypted supplemental data 333 to the untrusted environment 104 via the interface 322.

Encrypted processing results are received from one or more untrusted algorithms in the untrusted environment at step 416. This may include, for example, the homomorphic encryptor-decryptor 316 receiving the encrypted data 304e from one or more untrusted algorithms 330 in the untrusted environment 104 via the interface 322. The encrypted processing results are homomorphically decrypted to produce second processing results at step 418. This may include, for example, the homomorphic encryptor-decryptor 316 performing homomorphic decryption of the encrypted data 304e to recover the data processing results 311b. The first and second processing results are stored at step 420. This may include, for example, the algorithm(s) 312 storing the results 311a in the result memory store 318 and the homomorphic encryptor-decryptor 316 storing the results 311b in the result memory store 318.

The cryptographic keys used for homomorphic encryption and decryption are rotated at step 422. This may include, for example, the homomorphic security manager 320 triggering the homomorphic key manager 319 to send new cryptographic keys to the homomorphic encryptor-decryptor 316 at a periodic interval or at other times.

Note that not all steps shown in FIG. 4 need to be performed for all data and all processing. For example, in some situations, it may not be necessary to process data using one or more trusted algorithms 312 in the trusted environment 102. As another example, in some situations, it may not be necessary to receive and encrypt supplemental data 332 from the untrusted environment 104. As yet another example, the processing results 311a and 311b need not be stored together and may be stored separately, output to the same or different destinations, or used in any other suitable manner.

As shown in FIG. 5, encrypted data is received and stored in an untrusted environment at step 502. This may include, for example, one or more untrusted computing nodes 108 in the untrusted environment 104 receiving the encrypted data 304d from the homomorphic encryptor-decryptor 316 via the interface 322. This may also include storing the encrypted data 304d in the untrusted memory store 324.

A determination is made whether supplemental data is needed to process the received encrypted data at step 504. This may include, for example, the one or more untrusted computing nodes 108 determining whether supplemental data 332 is needed by the untrusted algorithm(s) 330 to process the encrypted data 304d. If so, the supplemental data is sent to the trusted environment at step 506, and homomorphically encrypted supplemental data is received from the trusted environment at step 508. This may include, for example, the encryption service 334 providing a request containing the supplemental data 332 (and at least one associated encrypted header of the received encrypted data) to the homomorphic encryptor-decryptor 316 via the interface 322. This may also include the encryption service 334 receiving the encrypted supplemental data 333 from the homomorphic encryptor-decryptor 316 via the interface 322.

The encrypted data and the encrypted supplemental data are provided to one or more untrusted algorithms at step 510, and encrypted processing results are generated using the one or more untrusted algorithms, the encrypted data, and the encrypted supplemental data at step 512. This may include, for example, one or more data processing algorithms 330 using the encrypted data 304d and the encrypted supplemental data 333 to generate the encrypted data 304e, which includes an encrypted version of the data processing results 311b. The encrypted processing results are provided to the trusted environment at step 514. This may include, for example, the one or more untrusted algorithms 330 providing the encrypted data 304e to the homomorphic encryptor-decryptor 316 via the interface 322.

Again, note that not all steps shown in FIG. 5 need to be performed for all data and all processing. For example, in some situations, it may not be necessary to provide supplemental data 332 to and receive encrypted supplemental data 333 from the trusted environment 102 in order to process the encrypted data 304d.

Although FIGS. 4 and 5 illustrate examples of methods 400 and 500 for supporting privacy-preserving data processing across multiple computing nodes, various changes may be made to FIGS. 4 and 5. For example, while shown as a series of steps in each figure, various steps in each figure can overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus configured for use in a first environment, the apparatus comprising:
    an interface configured to communicate with at least one node in a second environment; and
    at least one processing device communicatively coupled to the interface, the at least one processing device configured to:
        obtain first data to be processed in the second environment;
        homomorphically encrypt the first data to produce first encrypted data;
        provide the first encrypted data to the second environment via the interface;
        receive supplemental data from the second environment via the interface;
        homomorphically encrypt the supplemental data to produce encrypted supplemental data;
        provide the encrypted supplemental data to the second environment via the interface;
        receive second encrypted data from the second environment via the interface; and
        homomorphically decrypt the second encrypted data to recover data processing results generated in the second environment using the first encrypted data and the encrypted supplemental data.

2. The apparatus of claim 1, wherein the at least one processing device is further configured to:
    obtain second data to be processed in the first environment;
    store the first and second data in a first common memory store;
    generate additional data processing results in the first environment using the second data; and
    store the recovered data processing results and the additional data processing results in a second common memory store.

3. The apparatus of claim 1, wherein the at least one processing device is further configured to reorder the first data prior to homomorphically encrypting the first data.

4. The apparatus of claim 1, wherein the at least one processing device is further configured to rotate cryptographic keys used to homomorphically encrypt the first data, homomorphically encrypt the supplemental data, and homomorphically decrypt the second encrypted data.

5. The apparatus of claim 1, wherein the first data comprises multiple data streams.

6. The apparatus of claim 1, wherein:
    the first environment comprises a trusted computing environment; and
    the second environment comprises an untrusted computing environment.

7. A method used in a first environment, the method comprising:
    obtaining first data to be processed in a second environment;
    homomorphically encrypting the first data to produce first encrypted data;
    providing the first encrypted data to the second environment;
    receiving supplemental data from the second environment;
    homomorphically encrypting the supplemental data to produce encrypted supplemental data;
    providing the encrypted supplemental data to the second environment;
    receiving second encrypted data from the second environment; and
    homomorphically decrypting the second encrypted data to recover data processing results generated in the second environment using the first encrypted data and the encrypted supplemental data.

8. The method of claim 7, further comprising:
    obtaining second data to be processed in the first environment;
    storing the first and second data in a first common memory store;
    generating additional data processing results in the first environment using the second data; and
    storing the recovered data processing results and the additional data processing results in a second common memory store.

9. The method of claim 7, further comprising:
    reordering the first data prior to homomorphically encrypting the first data.

10. The method of claim 7, further comprising:
    rotating cryptographic keys used to homomorphically encrypt the first data, homomorphically encrypt the supplemental data, and homomorphically decrypt the second encrypted data.

11. The method of claim 7, wherein the first data comprises multiple data streams.

12. The method of claim 7, wherein:
    the first environment comprises a trusted computing environment; and
    the second environment comprises an untrusted computing environment.

13. An apparatus configured for use in a second environment, the apparatus comprising:
    an interface configured to communicate with at least one node in a first environment; and
    at least one processing device communicatively coupled to the interface, the at least one processing device configured to:
        obtain homomorphically encrypted data from the first environment via the interface;
        provide supplemental data to the first environment via the interface;
        receive homomorphically encrypted supplemental data from the first environment via the interface;

process the homomorphically encrypted data and the homomorphically encrypted supplemental data to generate encrypted data processing results; and
provide the encrypted data processing results to the first environment via the interface.

14. The apparatus of claim 13, wherein the at least one processing device is further configured to process part of the homomorphically encrypted data without using any encrypted supplemental data.

15. The apparatus of claim 13, wherein, to process the homomorphically encrypted data and the homomorphically encrypted supplemental data, the at least one processing device is configured to execute multiple signal processing algorithms that operate using the homomorphically encrypted data and the homomorphically encrypted supplemental data.

16. The apparatus of claim 13, wherein the at least one processing device is further configured to:
receive additional data from the first environment that is not homomorphically encrypted via the interface;
generate additional data processing results using the additional data; and
provide the additional data processing results to the first environment via the interface.

17. A method used in a second environment, the method comprising:
obtaining homomorphically encrypted data from a first environment;
providing supplemental data to the first environment;
receiving homomorphically encrypted supplemental data from the first environment;
processing the homomorphically encrypted data and the homomorphically encrypted supplemental data to generate encrypted data processing results; and
providing the encrypted data processing results to the first environment.

18. The method of claim 17, further comprising:
processing part of the homomorphically encrypted data without using any encrypted supplemental data.

19. The method of claim 17, wherein processing the homomorphically encrypted data and the homomorphically encrypted supplemental data comprises:
executing multiple signal processing algorithms that operate using the homomorphically encrypted data and the homomorphically encrypted supplemental data.

20. The method of claim 17, further comprising:
receiving additional data from the first environment that is not homomorphically encrypted;
generating additional data processing results using the additional data; and
providing the additional data processing results to the first environment.

* * * * *